United States Patent
Nutt et al.

(10) Patent No.: US 11,213,975 B2
(45) Date of Patent: Jan. 4, 2022

(54) HIGH-PERMEABILITY COMPOSITE PREPREG CONSTRUCTIONS AND METHODS FOR MAKING THE SAME

(71) Applicant: University of Southern California, Los Angeles, CA (US)

(72) Inventors: Steven Nutt, Irvine, CA (US); Lessa Grunenfelder, Los Angeles, CA (US); Timotei Centea, Venice, CA (US); Mark Anders, Los Angeles, CA (US); William Thomas Edwards, Fullerton, CA (US); Sarah Grace Katz Schechter, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 16/475,371

(22) PCT Filed: Jan. 5, 2018

(86) PCT No.: PCT/US2018/012665
§ 371 (c)(1),
(2) Date: Jul. 1, 2019

(87) PCT Pub. No.: WO2018/129378
PCT Pub. Date: Jul. 12, 2018

(65) Prior Publication Data
US 2019/0358858 A1 Nov. 28, 2019

Related U.S. Application Data

(60) Provisional application No. 62/442,952, filed on Jan. 5, 2017.

(51) Int. Cl.
*B32B 3/00* (2006.01)
*B29B 15/12* (2006.01)
(Continued)

(52) U.S. Cl.
CPC ............ *B29B 15/122* (2013.01); *B29C 70/20* (2013.01); *B29C 70/443* (2013.01); *C08J 5/24* (2013.01);
(Continued)

(58) Field of Classification Search
CPC ..... B29C 70/20; B29C 70/443; B29B 15/122; C08J 5/24
See application file for complete search history.

(56) References Cited

U.S. PATENT DOCUMENTS 6,503,856 B1 * 1/2003 Broadway ............. H01M 4/667
442/366
8,696,965 B2 4/2014 Bongiovanni et al.
(Continued)

FOREIGN PATENT DOCUMENTS

EP 1379376 B1 1/2004
EP 1419875 A1 5/2004
(Continued)

OTHER PUBLICATIONS

International Search Report dated Mar. 15, 2018 in corresponding International Patent Application No. PCT/US2018/012665 filed Jan. 5, 2018; total 2 pages.
(Continued)

*Primary Examiner* — Elizabeth E Mulvaney
(74) *Attorney, Agent, or Firm* — Snell & Wilmer LLP (57) ABSTRACT

Methods, apparatuses, and systems for making prepregs are disclosed. A method may include depositing a resin material onto a surface of a fiber bed and forming a number of discrete resin regions thereon. A distance between the resin regions may be measured to provide desired exposed portions of the surface to facilitate permeation of air through the
(Continued)

exposed portions of the surface in a direction perpendicular to a plane of the fiber bed during a curing process of the prepreg.

16 Claims, 6 Drawing Sheets

(51) Int. Cl.
*B29C 70/20* (2006.01)
*B29C 70/44* (2006.01)
*C08J 5/24* (2006.01)
*B29K 309/08* (2006.01)
*B29K 307/04* (2006.01)

(52) U.S. Cl.
CPC ...... *B29K 2307/04* (2013.01); *B29K 2309/08* (2013.01); *C08J 2361/10* (2013.01); *C08J 2363/00* (2013.01); *C08J 2375/04* (2013.01); *C08J 2379/08* (2013.01)

(56) References Cited

U.S. PATENT DOCUMENTS

| | | | |
|---|---|---|---|
| 9,259,879 B2 | 2/2016 | Roman et al. | |
| 9,802,358 B2 | 10/2017 | Roman et al. | |
| 10,016,966 B2 * | 7/2018 | Greaser | B32B 37/26 |
| 10,329,696 B2 | 6/2019 | Roman et al. | |
| 10,583,615 B2 * | 3/2020 | Blackburn | B32B 5/18 |
| 2012/0107560 A1 | 5/2012 | Rogers et al. | |
| 2016/0257102 A1 | 9/2016 | Butler | |
| 2019/0153634 A1 | 5/2019 | Roman et al. | |

FOREIGN PATENT DOCUMENTS

| | | |
|---|---|---|
| GB | 567470 A | 2/1945 |
| GB | 2375989 A | 12/2002 |
| GB | 2375989 B | 6/2005 |

OTHER PUBLICATIONS

Written Opinion of the International Searching Authority dated Mar. 15, 2018 in corresponding International Patent Application No. PCT/US2018/012665 filed Jan. 5, 2018; total 8 pages.

International Preliminary Report on Patentability dated Jul. 9, 2019 in corresponding International Patent Application No. PCT/US2018/012665 filed Jan. 5, 2018; total 9 pages.

SGK Schechter, T Centea, SR Nutt, "Polymer film dewetting for fabrication of out-of-autoclave prepreg with high through-thickness permeability." Pages submitted: 11; Published Nov. 1, 2018, at 114 Composites Part A: Applied Science & Manufacturing 86-96 (Elsevier).†

* cited by examiner
† cited by third party

HIGH-PERMEABILITY COMPOSITE PREPREG CONSTRUCTIONS AND METHODS FOR MAKING THE SAME

CROSS-REFERENCE TO RELATED APPLICATIONS

The present application is a U.S. National Stage entry under 35 U.S.C. § 371 of International Application No. PCT/US2018/012665 filed Jan. 5, 2018, which claims priority to U.S. Provisional Application No. 62/442,952 filed Jan. 5, 2017, which applications are hereby incorporated by reference in their entirety.

STATEMENT AS TO FEDERALLY SPONSORED RESEARCH

This invention was made with government support under contract number 1229011 awarded by the National Science Foundation (NSF). The government has certain rights in this invention.

FIELD

Composite prepreg constructions as disclosed herein are manufactured in a manner that provides an improved degree of air removal during consolidation and cure, thereby avoiding the need to use autoclaves and yielding a composite part having reduced or eliminated strength-limiting internal porosity and aesthetically unacceptable surface defects.

BACKGROUND

Currently, composite parts as made for use in such applications as aerostructures and the like are produced from prepregs (i.e., a partially cured, fiber-reinforced precursor material already impregnated with a synthetic resin) that are consolidated/cured in autoclaves. These processes limit production rates and part sizes, and attach significant cost burdens, both capital and operating, to the production of such parts. The autoclave thus presents a production bottleneck. For example, to reach future production rates required for the manufacture of single-aisle aircraft, alternatives to autoclave cure of prepregs that are faster and less costly must be identified, or such aircraft will not be designed with composite materials.

Out of autoclave (OoA) prepregs (prepregs cured outside of an autoclave) and methods for making the same are known, and have been developed to address these problems and provide a route around the bottleneck. Such known OoA prepregs feature channels for air evacuation located in the plane of the fiber bed. Basically, fiber beds (woven fabric or unidirectional (UD) fibers) are partly impregnated with resin film, leaving dry fiber channels at the mid-plane to facilitate air removal during cure. These "breathing pathways" are effective for in-plane air removal, but offer little or no ability to evacuate air in the out-of-plane or through-thickness direction. As a result, limitations arise when making (a) large parts with long breathe-out distances, and (b) parts with corners, ply drop-offs, or other geometric features which occlude the in-plane "breathing pathways" and trap air in the part. Further, the use of such conventional OoA prepregs also requires meticulous attention to detail during part production.

One approach to address the lack of through-thickness "breathing pathways" is embodied in "Z-preg," a prepreg format featuring wide resin strips applied to dry woven fabric, which affords additional through-thickness air permeability. A drawback to Z-pregs and conventional OoA formats, and the prepreg products formed therefrom, is resin-flow issues, including excessive resin bleed, resin-starved regions, and premature occlusion of breathing pathways. Because of both the large spacing between resin strips and the large width of the resin strips in Z-preg, the drawbacks cited above are problematic, and thus these products are not widely used.

There is, therefore, a need/desire to develop a more robust prepreg format and process route for making prepregs that overcome both the bottleneck issue associated with using autoclaves, and the above-noted limitations associated with the known OoA approach of making prepregs.

SUMMARY

Apparatuses, systems, and methods of producing prepregs (and related composite parts) are disclosed herein. The methods may include making a prepreg comprising depositing a resin material onto a surface of a unidirectional fiber bed and forming a number of discrete resin regions thereon. A distance between the resin regions may be measured to provide desired exposed portions of the surface to facilitate permeation of air through the exposed portions of the surface in a direction perpendicular to a plane of the unidirectional fiber bed during a curing process of the prepreg.

In one embodiment, a method for making a prepreg may include performing droplet deposition of a resin material onto a surface of a fiber bed and forming a number of discrete resin regions thereon and portions of the surface between the discrete resin regions. The portions of the surface between the discrete resin regions may facilitate permeation of air through the surface in a through-thickness direction of the fiber bed.

In one embodiment, a method for making a prepreg may include applying a configuration of a number of discrete resin regions to a surface of a fiber bed by applying to the surface of the fiber bed a printing surface having recesses corresponding to the configuration and that include the resin. Portions of the surface of the fiber bed between the discrete resin regions may facilitate permeation of air through the surface of the fiber bed in a through-thickness direction of the fiber bed.

In one embodiment, a method for making a prepreg may include providing a resin film including a number of discrete resin regions. De-wetting of the resin film may be performed to increase a distance of the discrete resin regions from each other. The discrete resin regions may be applied to a surface of a fiber bed after the de-wetting has been performed, to form portions of the surface between the discrete resin regions, wherein the portions of the surface between the discrete resin regions facilitate permeation of air through the surface in a through-thickness direction of the fiber bed.

In one embodiment, a prepreg is disclosed comprising a unidirectional fiber bed having a thickness and a surface. A number of discrete resin regions are disposed on the surface such that a number of portions of the surface between the discrete resin regions facilitate permeation of air through the surface in a through-thickness direction of the unidirectional fiber bed during a curing process of the prepreg.

In one embodiment, a method for making a prepreg may include depositing a resin material onto a surface of a fiber bed and forming a number of discrete resin regions thereon and portions of the surface between the discrete resin regions without relying on a surface topography or architecture of the fiber bed to form the number of discrete resin regions thereon and the portions of the surface between the discrete resin regions, wherein the portions of the surface between the discrete resin regions facilitate permeation of air through the surface in a through-thickness direction of the fiber bed.

BRIEF DESCRIPTION OF THE DRAWINGS

These and other features and advantages of prepregs and methods of making the same, and other apparatuses, systems, and methods, as disclosed herein will be appreciated as the same becomes better understood by reference to the following detailed description and attached materials when considered in connection with the accompanying drawings wherein.

DESCRIPTION

Disclosed herein are apparatuses, systems, and methods to produce a composite prepreg with high permeability in the through-thickness direction. An important element of the process is the means to deliberately place gaps in the resin applied to unidirectional (UD) fiber or woven fabric or non-crimp fabric or a textile, thus greatly facilitating through-thickness air removal during consolidation and cure of composite parts and thereby reducing/eliminating strength-limiting porosity. As used herein, and as understood in the art, the term "fabric" is interchangeable with "woven fabric." The gaps may result in discrete resin regions having various geometric configurations, including parallel strips or grids. Other configurations such as various patterns (regular and irregular), among others, may be provided. The gaps may surround discrete islands of resin. The gaps may comprise perforations in a film.

Figure 1:
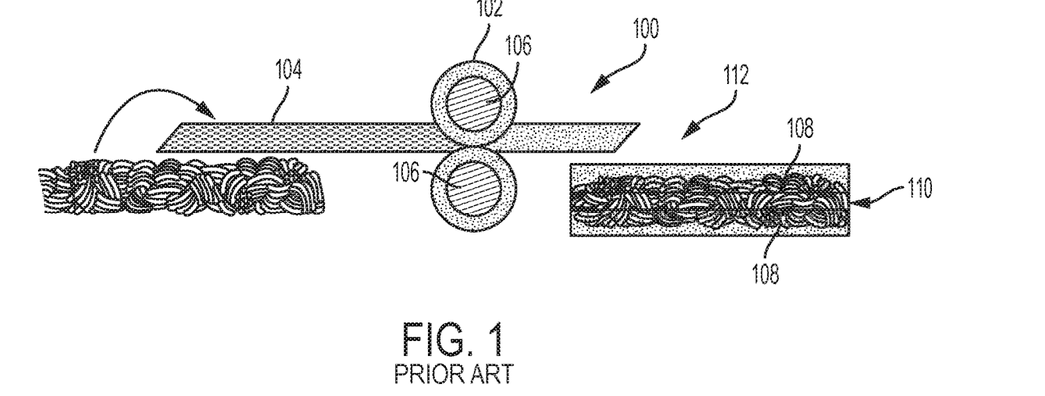
FIG. 1 is a schematic view of a conventional method for making OoA prepreg constructions.

FIG. 1 illustrates a conventional method 100 for making an OoA prepreg as disclosed above comprising breathing pathways in the plane of the fabric component. As illustrated, resin material 102 is combined with a desired fabric bed 104 (shown in close-up and at a smaller scale in FIG. 1) e.g., by way of rollers 106, causing the fabric bed 104 to be partly impregnated with the resin to form a continuous resin film 108 in the impregnated region. This leaves dry fabric channels 110 at the mid-plane of the resulting prepreg 112 (a single ply shown in FIG. 2) to facilitate air removal during OoA curing processes. Such a process commonly features continuous films applied to both sides of a fabric bed (as shown in FIG. 1), and which are partly impregnated, leaving in-plane evacuation channels to facilitate air removal during consolidation.

Figure 2:
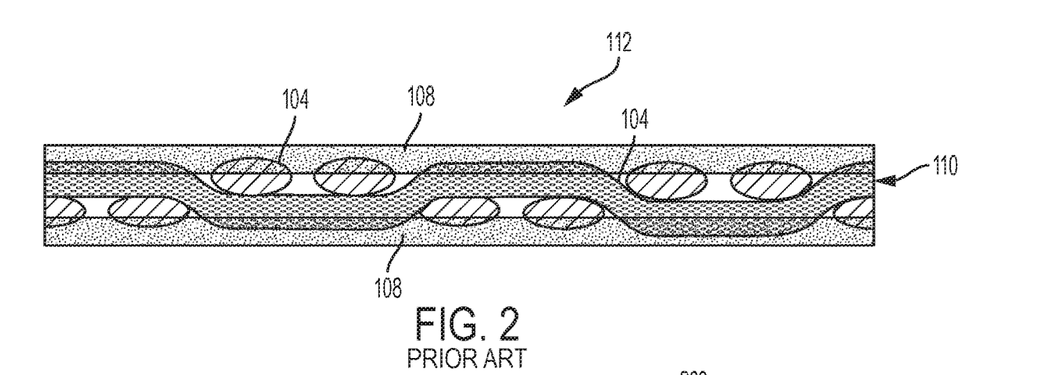
FIG. 2 is a cross sectional schematic view of a conventional OoA prepreg construction having a continuous resin film applied on both sides.
Figure 3:
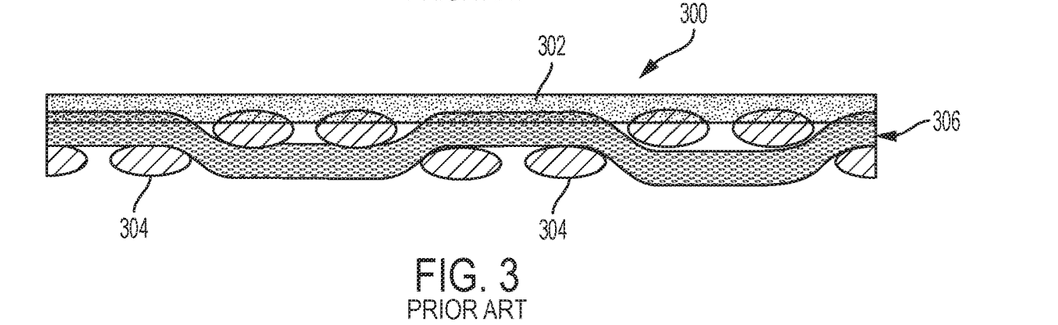
FIG. 3 is a cross sectional schematic view of a conventional OoA prepreg construction having a continuous resin film applied on only one side.

FIG. 2, for example, shows a schematic cross sectional view of the resulting prepreg 112 in which both surfaces (top and bottom) of the fabric bed 104 have been impregnated with a continuous resin film 108. The fabric bed 104 comprises a weave having fiber tows in the weft and warp directions. The dry fabric channels 110 are available for air to escape during curing processes. FIG. 3, as an additional example of a conventional method, shows a resulting prepreg 300 (a single ply shown in FIG. 3) in which only one surface (the top surface) the fabric bed 304 has been impregnated with a continuous resin film 302. The prepreg 300, however, during a curing process may be stacked with other similar prepreg plies, such that the only air channel remains a in-plane dry fabric channel 306.

Figure 4:
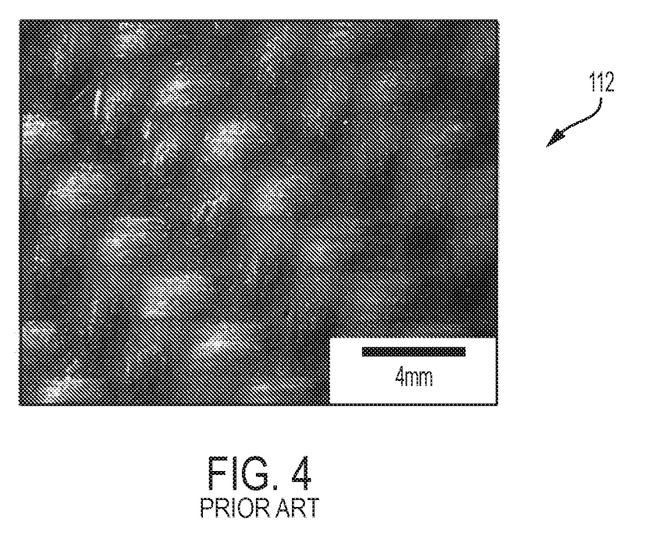
FIG. 4 is a photomicrograph of the surface of a conventional OoA prepreg.

FIG. 4 illustrates a photomicrograph of the top surface of the conventional OoA prepreg 112, in which the entirety of the top surface is shown to be impregnated with the continuous resin film.

The distribution of polymer resin as disclosed according to methods disclosed herein contrasts with such conventional methods of making prepregs intended for Out-of-Autoclave curing (OoA). The concepts as disclosed herein include a number of discrete resin regions disposed on a surface of a fiber bed. The discrete resin regions comprise discontinuous resin on the surface of the fiber bed. The discrete resin regions serve to enhance the through-thickness permeability of the prepregs and enhance removal of air from the prepreg during curing processes. Various patterns (regular or irregular) of the discontinuous resin may be applied to the surface of the fiber bed. In methods disclosed herein, the discrete resin regions may comprise resin islands, or a number of discrete pore regions within the resin (or a resin grid). In certain embodiments, perforated films may be applied to the surface of the fiber bed.

In methods disclosed herein, a distance between the resin regions may be measured to provide desired exposed portions of the surface to facilitate permeation of air through the exposed portions of the surface in a direction perpendicular to a plane of the fiber bed during a curing process of the prepreg. The measuring may include controlling, prescribing, designing, creating, or performing other forms of measuring. The distance may be determined to produce a desired result, as discussed regarding methods herein.

The methods disclosed herein may also contrast with conventional methods of making prepregs because the methods disclosed herein may not rely on the particular surface topography or architecture of the fiber bed to form the discrete resin regions. Prior forms of deposition may form resin regions by relying on raised or heightened portions of a fabric weave to cause the resin regions to be formed (e.g., relying on a raised contact surface of the fiber bed, which may contact a roller or the like). The methods disclosed herein may be utilized with multiple forms of fiber beds (fabric or unidirectional fiber bed or a non-crimp fabric or a textile) having multiple forms of surface topography or architecture. The methods disclosed herein may be utilized with a fiber bed having no significant surface perturbations, such that the surface of the fiber bed may be considered to be flat. This is a feature recognized with unidirectional fiber beds. The methods disclosed herein accordingly differ from prior methods, which may rely on the surface topography or architecture of the fiber bed to produce discrete resin regions, and may not be usable with unidirectional fiber beds.

Figure 5:
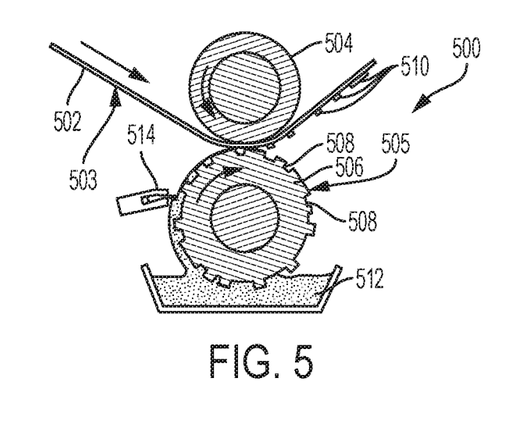
FIG. 5 is a schematic view of a method of making a prepreg as disclosed herein.

One method according to the disclosure is a process of applying a configuration of a number of discrete resin regions to a surface of a fiber bed by applying a printing surface to the surface of the fiber bed. The printing surface may have recesses corresponding to the configuration and that include the resin. Application of the printing surface of the surface of the fiber bed applies the discrete resin regions to the fiber bed surface. FIG. 5 illustrates such a method. FIG. 5 illustrates a process 500 in which a fiber bed 502 has a surface 503 upon which a printing surface 505 is applied. The printing surface 505 includes a number of recesses 508 that are configured to correspond to the configuration of the discrete resin regions 510 on the surface 503 of the fiber bed 502. The shape and position of the recesses 508 on the printing surface 505 defines the shape and position of the discrete resin regions 510 on the surface 503 of the fiber bed 502. For example, a desired depth of the recess in the printing surface 505 may dispense a desired thickness of resin material onto the fiber bed 502.

The surface 503 of the fiber bed 502 may be passed along the printing surface 505 to apply the discrete resin regions 510 thereon. As shown in FIG. 5, the printing surface 505 may comprise a roller 506 that rolls relative to the surface 503 of the fiber bed 502. An opposing roller, or impression roller 504, may also be utilized. The fiber bed 502 may pass between the rollers 504, 506. The printing surface 505 may rotate through a reservoir or liquid bath 512 to apply the resin material to the printing surface 505. A measuring blade, a doctor blade, or the like 514 may be utilized to remove excess resin from the printing surface 505 of the roller 506 before it is placed into contact with the fiber bed 502.

The recesses 508 of the printing surface 505 may comprise grooves as shown in FIG. 5. The grooves may be parallel grooves to apply a pattern of parallel strips to the surface 503 of the fiber bed 502. In an example, resin strips of selected width (e.g., from about 1-10 mm) and spacing (e.g., from about 1-10 mm) may be applied in this manner. As shown in FIG. 5, irregular size and spacing of the strips may be provided. In other embodiments, other configurations of resin may be applied to the surface 503, including grids and other patterns (whether regular or irregular). The configuration of the recesses may be determined based on the desired configuration of resin to be applied to the surface 503 (e.g., a grid pattern of recesses may be provided on the printing surface 505 to provide a desired grid pattern on the surface 503). While the recesses 508 in the form of grooves illustrated in FIG. 5 are oriented running parallel to an axis of the roller 506, it is to be understood that the grooves may be formed at any angle to the roller axis to apply the strips at any angle to the fiber bed 502. In an embodiment in which the fiber bed 502 is a fabric, the strips may be applied at an angle to the warp and weft tows of the fabric as desired for the end-use application.

Figure 6:
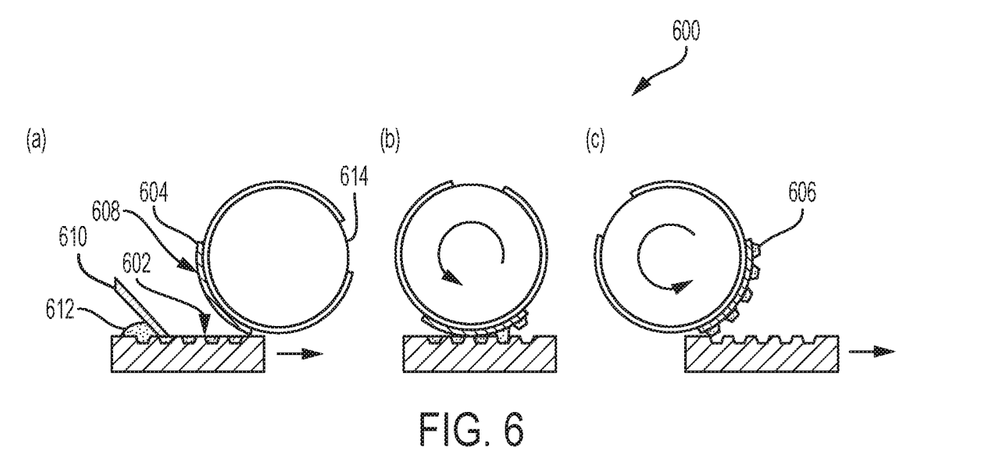
FIG. 6 is a schematic view of a method of making a prepreg as disclosed herein.

FIG. 6 illustrates an embodiment of a process 600, similar to the process 500 of FIG. 5, however, the printing surface 602 comprises a plate. The fiber bed 604 rotates relative to the printing surface 602 to apply the discrete resin regions 606 to the surface 608 of the fiber bed 604. Similar to the process of FIG. 5, a measuring blade, a doctor blade, or the like 610 may be utilized to remove excess resin 612 from the printing surface 602 of the plate before the surface 602 is placed into contact with the fiber bed 604. The fiber bed 604 may rotate along with a roller 614 to which it is coupled.

The processes of FIGS. 5 and 6 may be applied to one surface of the fiber bed, or may be applied to both surfaces (opposing top and bottom surfaces) of the fiber bed either simultaneously or in sequence.

The processes of FIGS. 5 and 6 may be considered to be a form of gravure printing. However, here, discrete resin regions are applied to the surfaces of the fiber bed. Portions of the surface of the fiber bed between the discrete resin regions may facilitate permeation of air through the surface of the fiber bed in the through-thickness direction of the fiber bed. The methods may be applied to either a fiber bed that comprises a unidirectional fiber bed or a fabric, or a non-crimp fabric, or a textile. The method does not rely on the surface topography or architecture of the fiber bed to produce the desired resin regions on the surfaces.

In one embodiment, the methods of FIGS. 5 and 6 may be modified such that a grid of perforations can be introduced to a continuous resin film by passing it over a perforating roller, producing a grid-like pattern of resin with periodic gaps.

Figure 7:
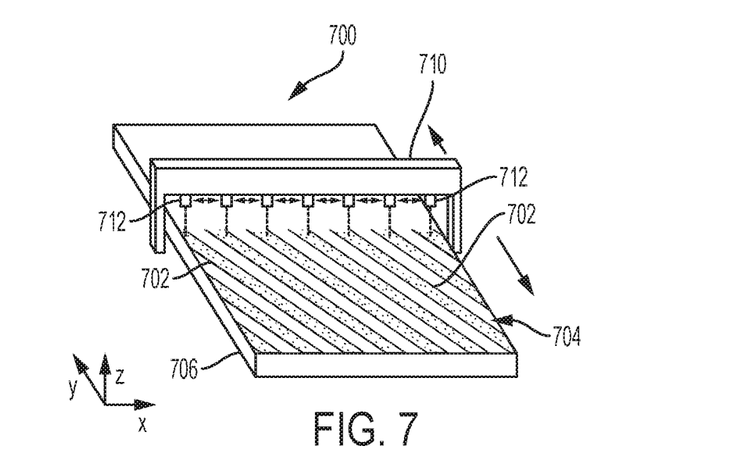
FIG. 7 is a schematic perspective view of a method of making a prepreg as disclosed herein.

FIG. 7 illustrates a process 700 of droplet deposition used to form a number of discrete resin regions 702 on a surface 704 of a fiber bed 706. The deposition process results in the number of discrete resin regions 702 and portions of the surface 704 between the resin regions 702 (shown in FIG. 7).

The droplet deposition process may involve spraying droplets of the resin material upon the surface 704 of the fiber bed 706. A desired configuration of discrete resin regions 702 may result on the surface 704. In FIG. 7, the discrete resin regions 702 are shown to form parallel strips extending diagonally along the surface 704 of the fiber bed 706. In other embodiments, other configurations may be applied, including extending longitudinally along the length of the fiber bed 706 (the "y" axis direction shown in FIG. 7) or width of the fiber bed 706 (the "x" axis direction shown FIG. 7), or grids, or other patterns (regular or irregular), or other configurations.

The droplet deposition may occur through a droplet deposition apparatus 710, which may include one or more nozzles 712 coupled to a frame 710. The nozzles 712 may be configured to move relative to the fiber bed 706 to apply a desired configuration of discrete resin regions 702 to the surface 704. The nozzles 712 or fiber bed 706 may be configured to move relative to each other to allow for movement in the x-axis direction or the y-axis direction (or the z-axis direction). The nozzles 712 may deposit the droplets in this manner upon the surface 704.

Figure 8:
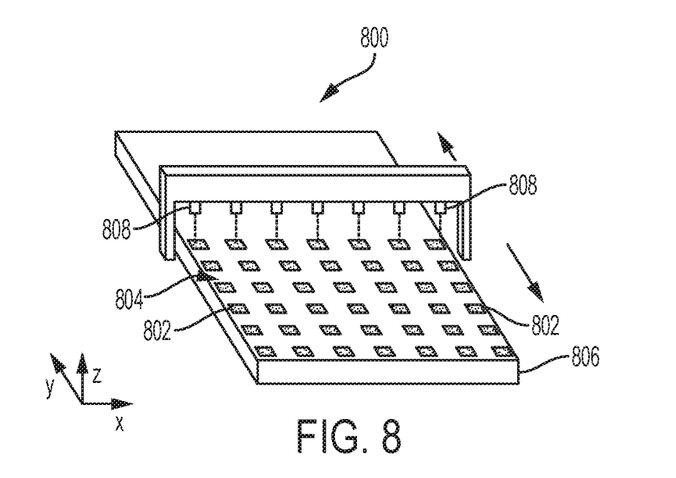
FIG. 8 is a schematic perspective view of a method of making a prepreg as disclosed herein.

FIG. 8 illustrates a process 800, similar to the process 700 of FIG. 7, however droplet deposition here is used to apply a grid of discrete resin regions 802 to the surface 804 of the fiber bed 806. The one or more nozzles 808 may be configured to spray the resin material in such a manner that spacing occurs between adjacent discrete resin regions 802 in the x-axis direction and the y-axis direction (as shown in FIG. 8).

The processes of FIGS. 7 and 8 result in application of the resin in a manner similar to ink jet printers. Patterns of resin with specific widths and spacing may result.

The processes of FIGS. 7 and 8 may be applied to one surface of the fiber bed, or may be applied to both surfaces (opposing top and bottom surfaces) of the fiber bed either simultaneously or in sequence. Portions of the surface of the fiber bed between the discrete resin regions may facilitate permeation of air through the surface of the fiber bed in the through-thickness direction (corresponding to the "z-axis" direction shown in FIGS. 7 and 8) of the fiber bed. The methods may be applied to either a fiber bed that comprises a unidirectional fiber bed or a fabric, or a non-crimp fabric, or a textile. The method does not rely on the surface topography or architecture of the fiber bed to produce the desired resin regions on the surfaces.

Figure 9:
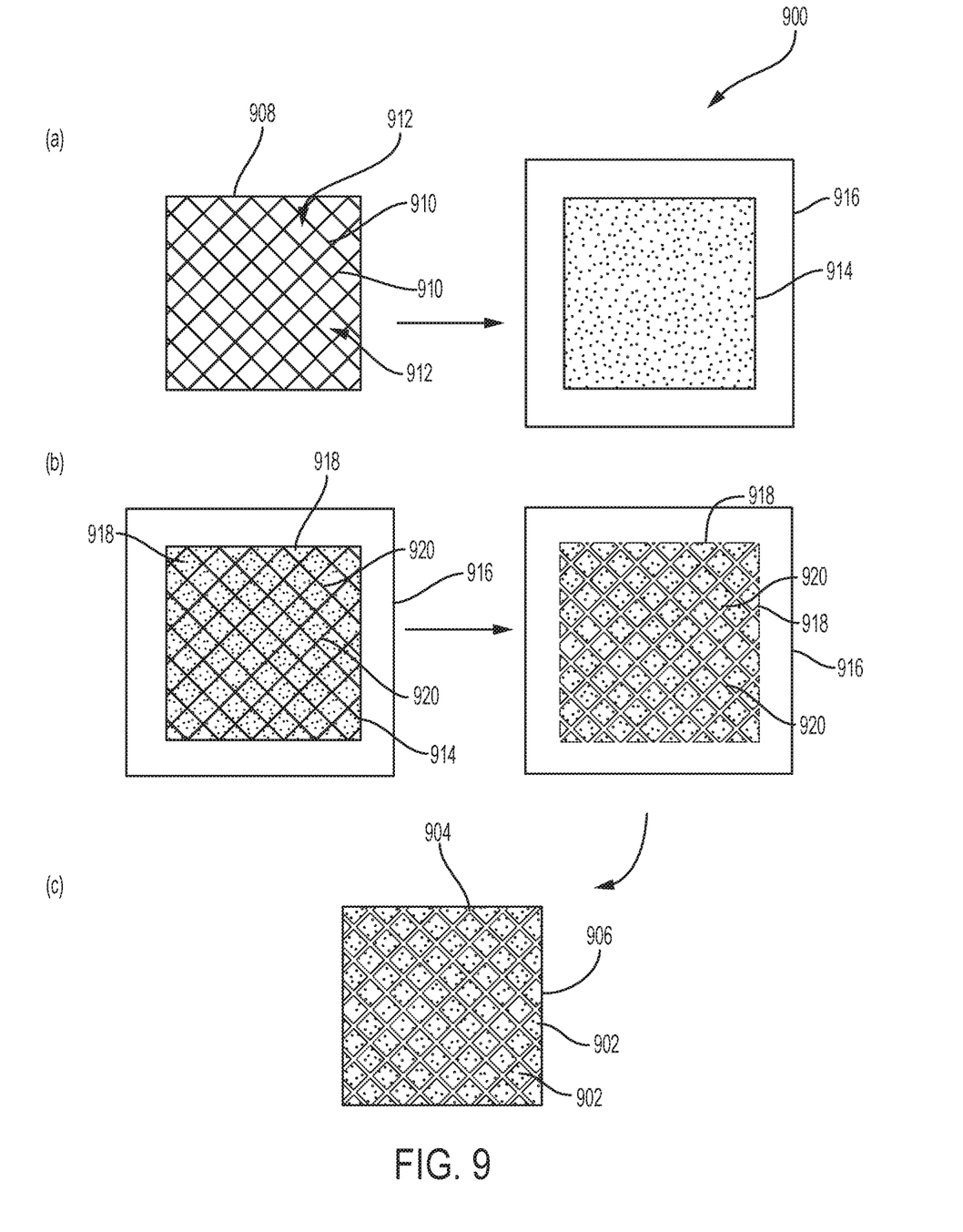
FIG. 9 is a schematic view of process steps of making a prepreg as disclosed herein.

FIG. 9 illustrates a process 900 utilizing de-wetting to assist in the formation of discrete resin regions 902 to a surface 904 of a fiber bed 906. The steps outlined in FIG. 9 may be varied, excluded, reordered, or supplemented as desired. In step (a) of FIG. 9, an imprint tool 908 may be provided. The imprint tool 908 may comprise a cutter device, a perforation device, a stencil, or other forms of imprint tools 908. Roll cutters may be utilized. In FIG. 9, the imprint tool 908 is shown as a cutter device in the form of a honeycomb sheet with rigid structures 910 separated by voids 712. The imprint tool 908 may comprise a metallic honeycomb sheet. The imprint tool 908 may be configured to have a shape corresponding to the desired shape of the discrete resin regions.

In step (a) of FIG. 9, the imprint tool 908 may be applied to a continuous resin film 914. The resin film 914 may be positioned on a backing substrate 916 such as a backing paper or other forms of substrates, such as a carrier sheet. The application of the imprint tool 908 to the resin film 914 may make imprints on the continuous resin film 914.

Step (b) of FIG. 9 illustrates the result of the imprint tool 908 upon the resin film 914. The imprint upon the resin film 914 may form a number of discrete resin regions 918 of the resin film 914. The imprint may define a desired configuration (such as a regular or irregular pattern, or other configurations as disclosed herein or desired). The imprint may comprise perforations in the film. The imprint may result in a number of imprint sites 920 between the resin regions 918. The desired configuration of discrete resin regions 918 may be controlled by controlling the imposed imprint site in a desired configuration. For example, in an embodiment in which a cutter tool is used as the imprint tool 908, the cutting pattern may define the configuration of the discrete resin regions 918. Various configurations of imprint sites 920 may be produced to result in the desired configuration of resulting resin regions.

The arrow between the two images of step (b) of FIG. 9 represents a de-wetting process for the imprinted resin film 914. The de-wetting process varies the dimensions of the resin regions 918 to increase a distance of the discrete resin regions 918 from each other. The resin regions 918 recede from the imprint sites 920. This may leave openings between the discrete resin regions 918 and may expose the underlying backing substrate 916. The de-wetting processes may include application of heat to the resin film 914. For example, in one embodiment, the resin film 914 may be heated with an oven (e.g., placed in an oven) or may be heated with another form of heating device. The oven may comprise a conveyor oven. The resin film may pass through the conveyor oven. The heating may comprise a brief process. The film 914 when heated de-wets by receding from the imprints, forming an intended configuration or pattern of openings. In other embodiments, other forms of de-wetting may be utilized or otherwise trigger de-wetting, and may produce a similar result.

In step (c) of FIG. 9, the discrete resin regions 918 may be applied to the surface 904 of the fiber bed 906 to form the discrete resin region 902 thereon. The discrete resin regions 918 may be transferred to the fiber bed 906 to apply the regions 918 thereon. The discrete resin regions 902 may have a desired configuration. As shown in step (c) of FIG. 9, the discrete resin regions 902 may form a grid, or may form other configurations as disclosed herein (e.g., parallel strips, other forms of grids, or patterns, among others).

In one embodiment, the resin film 914 (previously imprinted or not) may be positioned on the fiber bed 906 prior to the de-wetting process. The resin film 914 may be imprinted on the fiber bed 906 and may be de-wetted after the resin film 914 is applied to the surface of the fiber bed 906. In one embodiment, the resin film 914 may be imprinted prior to being applied to the fiber bed 906 and may be de-wetted after being applied to the fiber bed 906. In embodiments, resin material may be de-wetted prior to, during, or after the resin material is deposited onto the surface of the fiber bed.

The processes of FIG. 9 may be applied to one surface of the fiber bed, or may be applied to both surfaces (opposing top and bottom surfaces) of the fiber bed either simultaneously or in sequence. Portions of the surface of the fiber bed between the discrete resin regions may facilitate permeation of air through the surface of the fiber bed in the through-thickness direction of the fiber bed. The methods may be applied to either a fiber bed that comprises a unidirectional fiber bed or a fabric, or a non-crimp fabric, or a textile. The method does not rely on the surface topography or architecture of the fiber bed to produce the desired resin regions on the surfaces. This method may be particularly useful as a retrofit for existing prepregging machines.

In one embodiment, the processes of FIG. 9 may be modified such that resin film is heated to create perforations on UD (unidirectional) fibers.

Figure 10:
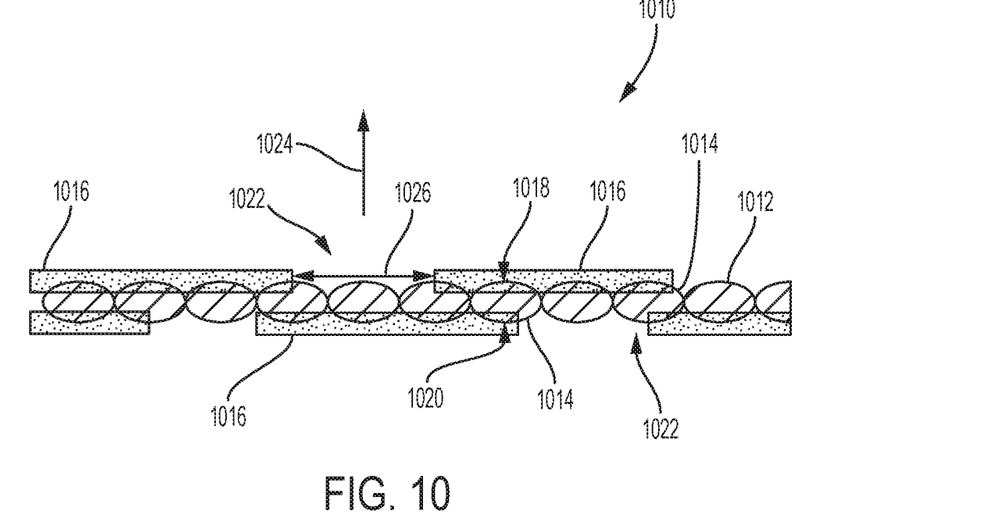
FIG. 10 is a cross sectional schematic view of a prepreg as disclosed herein.

FIG. 10 illustrates a cross sectional illustration of a prepreg 1010 in which a fiber bed 1012 is in the form of a unidirectional fiber bed. The unidirectional fibers 1014 are shown extending outward from the page. Discrete resin regions 1016 are disposed on top and bottom surfaces 1018, 1020, respectively, of the fiber bed 1012. The discrete resin regions 1016 are separated by portions (e.g., portion 1022) of the surface that are exposed and not covered by or impregnated with resin. The exposed portions 1022 may facilitate permeation of air through the surface in the through-thickness direction 1024 during a curing process.

A distance 1026 between the resin regions 1016 may be set such that limited resin flow is required to close the gap between resin regions 1016 during curing. In embodiments according to the methods disclosed herein, the distance 1026 may have a range of between 0.1 millimeters (mm) and 10 mm. In other embodiments, other ranges of distances 1026 may be utilized. In embodiments, the distances may be determined based on resin chemistry, desired temperature cure cycles, and/or end-use application, among other factors.

The prepreg 1010 disclosed in FIG. 10 may be produced by the processes disclosed herein. The discrete resin regions 1016 may be produced by the processes disclosed herein.

The processes disclosed herein may not only be used to produce prepreg with unidirectional fiber beds, as disclosed in FIG. 10, but may also be used to produce prepreg with fabric or non-crimp fabric or a textile. The cross section of FIG. 10 will appear similar, with the configuration of the fibers therein varied according to the type of fabric, non-crimp fabric, or textile. The processes disclosed herein are not dependent on a particular surface topography or architecture of the fabric bed, and may accordingly be used with either fabric or a non-crimp fabric or a unidirectional fiber bed or a textile.

The use and presence of discrete resin regions 1016 with a unidirectional fiber bed, and the processes of making such a prepreg with a unidirectional fiber bed, as disclosed herein, are novel, as well as the other methods, apparatuses, and systems disclosed herein.

A benefit of the air channels formed in the through-thickness direction of the prepregs disclosed herein is reduced void formation (both internal voids or internal porosity and surface voids). The through-thickness air channels allow for improved withdrawal of air or other gas during a curing process, which may include vacuum processes and a heating process. A much greater through-thickness permeability is produced to enhance air removal and reduce defects in parts. Prepreg produced through the methods disclosed herein may result in near-zero internal void formation (near-zero porosity) and flawless external surfaces.

Figure 11:
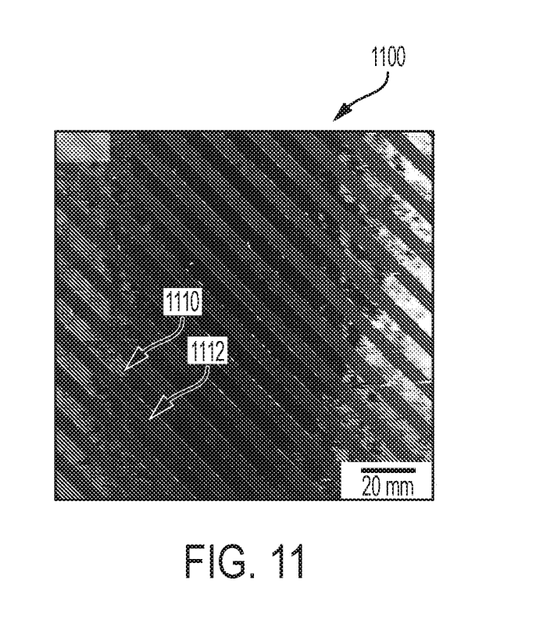
FIG. 11 is a photomicrograph of a prepreg according the principles as disclosed herein.

FIG. 11 illustrates an example prepreg 1100 made in accordance with the principles disclosed herein comprising a number of discontinuous resin regions 1110 (in the form of parallel strips) disposed on a surface of a unidirectional fiber bed, and a number of exposed surface regions 1112 of the unidirectional fiber bed that are not covered by the resin regions or strips to thereby create much greater through-thickness permeability to enhance air removal and reduce defects in parts.

The composite part formation and curing processes disclosed herein may include a process of layering multiple prepregs (prepreg plies), such as the prepreg 1010 shown in FIG. 10. Multiple layers or plies of the prepreg may be stacked together. A composite part resulting from the methods herein may comprise the cured prepreg (single layer or ply), or may comprise a cured stack of the prepreg, or may comprise the ultimate resulting composite part (e.g., aerospace part such as a fuselage, or sporting good part such as a sailing mast, among others). The composite parts comprise a part of the disclosure herein. The presence of the through-thickness air channels allows for multiple plies to be utilized without significant decrease in internal void quality (or lack of internal voids). The multiple plies may be cured together in a lamination process. The curing processes may include a vacuum process, or a heating process, or other curing process, and combinations thereof. The curing processes preferably occurs OoA, and preferably in a vacuum bag only (VBO) implementation. The methods herein may include placing the prepreg or layers of prepreg in a vacuum bag for a curing process, which may including vacuuming air from the prepreg(s) and heating, among other processes. It is contemplated other forms of curing processes may be utilized. The curing processes of any of the methods disclosed herein may occur in an autoclave or through another curing mechanism.

Prepregs made according to the methods disclosed herein may comprise materials conventionally used to form prepregs, which may include and not be limited to carbon or glass fiber, and epoxy, polyimide, BMI, cyanate ester, polyurethane, phenolic, or other polymer resin and the like.

A benefit common to all of the embodiments disclosed herein is that the selection of widths and spacing affords control of the resin distribution in the resulting prepreg and the resulting composite part. An advantage of such in the resulting prepreg products or construction as disclosed herein over most commercial prepregs is the greater through-thickness permeability, which enables and facilitates air removal when in-plane channels are inadequate. A further feature and advantage of the methods disclosed herein may be that the resin is applied to fiber beds by a continuous process that affords control of the spatial distribution of the resin. The methods disclosed herein may remove the present part size limitation inherent with current OoA processing methods, and make the process of producing composite parts with OoA prepregs more robust by promoting through-thickness (in addition to in-plane) air removal. The methods disclosed herein also may occur independent of a surface topography or architecture of the underlying fiber bed, which enhances the breadth of utility of the processes and may reduce processing expenses.

Thus, the methods as disclosed herein for making prepregs may enable production of high-quality composite parts, including large parts and complex geometries, and do so in a manner avoiding the need to use autoclaves. The prepreg constructions and products resulting from such methods may have formats (resin and fiber distributions) that are optimized for production of challenging parts.

The prepregs disclosed herein may be utilized in a variety of industries, including production or repair of composite parts for aerospace (including aircraft parts, aircraft body parts, fuselage parts, among others) and sporting goods (including sailing masts), among other industries. Industries may also include composite parts for wind power, and automotive. Other applications may include medical (prosthetics, among others). The resulting composite parts disclosed herein may include aircraft parts, aircraft body parts, fuselage parts, wing parts, other aerospace parts, sailing masts, sail boat body parts, tennis racket handles, golf clubs, other sporting good parts, wind power generation parts, other wind power parts or power generation parts, automotive body parts (e.g., bumpers, frames, etc.), other automotive parts, prosthetics, other medical parts, among other composite parts and industries.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method for making a prepreg comprising:
   depositing a resin material onto a surface of a unidirectional fiber bed and forming a number of discrete resin regions thereon, wherein a distance between the resin regions is measured to provide desired exposed portions of the surface to facilitate permeation of air through the exposed portions of the surface in a direction perpendicular to a plane of the unidirectional fiber bed during a curing process of the prepreg, and wherein the step of depositing comprises applying a printing surface to the surface of the unidirectional fiber bed, the printing surface having recesses corresponding to a configuration of the discrete resin regions and that include the resin material.

2. The method of claim 1, wherein the prepreg when cured has near-zero internal porosity.

3. A method for making a prepreg comprising:
   depositing a resin material onto a surface of a unidirectional fiber bed and forming a number of discrete resin regions thereon, wherein a distance between the resin regions is measured to provide desired exposed portions of the surface to facilitate permeation of air through the exposed portions of the surface in a direction perpendicular to a plane of the unidirectional fiber bed during a curing process of the prepreg, and wherein the step of depositing comprises performing droplet deposition of the resin material onto the surface of the unidirectional fiber bed.

4. A method for making a prepreg comprising:
   depositing a resin material onto a surface of a unidirectional fiber bed and forming a number of discrete resin regions thereon, wherein a distance between the resin regions is measured to provide desired exposed portions of the surface to facilitate permeation of air through the exposed portions of the surface in a direction perpendicular to a plane of the unidirectional fiber bed during a curing process of the prepreg, and wherein the step of depositing comprising rolling the resin material onto the surface of the unidirectional fiber bed such that the resin regions are provided in the form of parallel strips or a grid.

5. A method for making a prepreg comprising:
   depositing a resin material onto a surface of a unidirectional fiber bed and forming a number of discrete resin regions thereon, wherein a distance between the resin regions is measured to provide desired exposed portions of the surface to facilitate permeation of air through the exposed portions of the surface in a direction perpendicular to a plane of the unidirectional fiber bed during a curing process of the prepreg, and de-wetting the resin material prior to the resin material being deposited onto the surface of the unidirectional fiber bed.

6. A composite part made from the prepreg of claim 1 by subjecting the prepreg to vacuum curing at elevated temperature conditions, wherein air passes through the prepreg via permeation in the direction perpendicular to the plane of the unidirectional fiber bed through the exposed portions of the surface existing between the resin regions.

7. The method of claim 1, wherein the printing surface comprises a roller, and the roller is rolled relative to the surface of the fiber bed to apply the configuration of the number of discrete resin regions to the surface of the fiber bed.

8. The method of claim 1, wherein the printing surface comprises a plate, and the surface of the fiber bed is rolled relative to the plate to apply the configuration of the number of discrete resin regions to the surface of the fiber bed.

9. The prepreg made by the method of claim 1, wherein the discrete resin regions have a configuration of parallel strips or a grid.

10. The prepreg made by the method of claim 1, wherein the discrete resin regions have an irregular configuration on the surface.

11. A method for making a prepreg comprising:
    depositing a resin material onto a surface of a fiber bed and forming a number of discrete resin regions thereon and portions of the surface between the discrete resin regions without relying on a surface topography or architecture of the fiber bed to form the number of discrete resin regions thereon and the portions of the surface between the discrete resin regions, wherein the portions of the surface between the discrete resin regions facilitate permeation of air through the surface in a through-thickness direction of the fiber bed, and wherein the step of depositing comprises applying a printing surface to the surface of the fiber bed, the printing surface having recesses corresponding to a configuration of the discrete resin regions and that include the resin material.

12. The method of claim 11, wherein the prepreg when cured has near-zero internal porosity.

13. A method for making a prepreg comprising:
depositing a resin material onto a surface of a fiber bed and forming a number of discrete resin regions thereon and portions of the surface between the discrete resin regions without relying on a surface topography or architecture of the fiber bed to form the number of discrete resin regions thereon and the portions of the surface between the discrete resin regions, wherein the portions of the surface between the discrete resin regions facilitate permeation of air through the surface in a through-thickness direction of the fiber bed, and wherein the step of depositing comprises performing droplet deposition of the resin material onto the surface of the fiber bed.

14. A method for making a prepreg comprising:
depositing a resin material onto a surface of a fiber bed and forming a number of discrete resin regions thereon and portions of the surface between the discrete resin regions without relying on a surface topography or architecture of the fiber bed to form the number of discrete resin regions thereon and the portions of the surface between the discrete resin regions, wherein the portions of the surface between the discrete resin regions facilitate permeation of air through the surface in a through-thickness direction of the fiber bed, and wherein the step of depositing comprising rolling the resin material onto the surface of the fiber bed such that the resin regions are provided in the form of parallel strips or a grid.

15. A composite part made from the prepreg made according to claim 11.

16. A method for making a prepreg comprising:
depositing a resin material onto a surface of a fiber bed and forming a number of discrete resin regions thereon and portions of the surface between the discrete resin regions without relying on a surface topography or architecture of the fiber bed to form the number of discrete resin regions thereon and the portions of the surface between the discrete resin regions, wherein the portions of the surface between the discrete resin regions facilitate permeation of air through the surface in a through-thickness direction of the fiber bed, and de-wetting the resin material prior the step of depositing.

* * * * *